United States Patent [19]
Davis, Jr. et al.

[11] Patent Number: 6,145,871
[45] Date of Patent: Nov. 14, 2000

[54] SEAMLESS AIRBAG WITH A MECHANICAL GAS BAG ATTACHMENT

[75] Inventors: Joseph J. Davis, Jr., Ortonville; Gary Sadek, Plymouth, both of Mich.

[73] Assignee: Lear Automotive Dearborn, Inc., Southfield, Mich.

[21] Appl. No.: 09/110,727

[22] Filed: Jul. 6, 1998

[51] Int. Cl.$^7$ .............................. B60R 21/16; B60R 21/20
[52] U.S. Cl. .................. 280/728.2; 280/732; 280/728.3
[58] Field of Search ............................. 280/728.1, 728.2, 280/728.3, 732

[56] References Cited

U.S. PATENT DOCUMENTS

| | | | |
|---|---|---|---|
| 5,280,947 | 1/1994 | Cooper | 280/728.3 |
| 5,292,151 | 3/1994 | Parker | 280/728.3 |
| 5,421,608 | 6/1995 | Parker et al. | 280/728.3 |
| 5,447,327 | 9/1995 | Jarboe et al. | 280/728.3 |
| 5,447,328 | 9/1995 | Iannazzi et al. | 280/728.3 |
| 5,698,283 | 12/1997 | Yamasaki et al. | 428/43 |

*Primary Examiner*—Paul N. Dickson
*Assistant Examiner*—Faye M. Fleming
*Attorney, Agent, or Firm*—MacMillan, Sobanski & Todd, LLC

[57] ABSTRACT

An unique airbag support assembly for an instrument panel airbag is formed of a unitary design. The airbag support assembly has a door flap which is secured by a flexible hinge member to an outer rim. The outer rim includes a plurality of support walls and fasteners secure an airbag module to the support walls. The outer rim and door flap are secured to an under face of the instrument panel by a welding technique. The instrument panel is formed with a tear seam on its under face, but no tear seam is formed on its front face.

15 Claims, 6 Drawing Sheets

6,145,871

SEAMLESS AIRBAG WITH A MECHANICAL GAS BAG ATTACHMENT

BACKGROUND OF THE INVENTION

This invention relates generally to an airbag support assembly for a vehicle airbag which provides a seamless instrument panel.

Incorporation of airbags into vehicles has created many design challenges for automotive designers. It is desirable to incorporate an airbag into an instrument panel in front of the vehicle passenger seat. When incorporating an airbag into an instrument panel it is necessary to provide an airbag cover that will reliably and safely tear, such that the passenger is protected. To this end, a tear seam has generally been provided in an instrument panel cover to insure that the airbag will safely deploy.

Vehicle designers prefer to have a continuous surface on the front face of the instrument panel whenever possible, so they would prefer to avoid having a tear seam in the instrument panel. Thus, recently there has been an effort to achieve a "seamless" design wherein there is no indication on the front face of the instrument panel that the airbag is behind the instrument panel. To achieve this design, tear seams or tear strips provided in the instrument panel are only provided on the under face, and not on the front face of the instrument panel.

A major design challenge with such "seamless" designs has been to provide an appropriate airbag support assembly for supporting the airbag before, during and after deployment through the instrument panel. Typically the airbag support assembly has been tailored to specific instrument panel configurations because the airbag support assembly is an integral part of the instrument panel itself. The instrument panel often requires additional support members near the airbag support assembly and the airbag support assembly must fit between these additional support members. Another challenge is that when the configuration of an instrument panel is changed, frequently the airbag support assembly must also be redesigned to fit in the new instrument panel.

Thus, it is desirable to create an airbag support assembly for an airbag that is independent of the instrument panel and that is standardized so that it can be incorporated in the "seamless" design of a variety of instrument panel configurations. Preferably, such an airbag support assembly would be simpler in design than current airbag support assemblies and permit a reduction in the number of additional support members currently used to support instrument panels adjacent to the airbag. Such a design would be readily adaptable to changes in the styling and configuration of the instrument panel.

SUMMARY OF THE INVENTION

In a disclosed embodiment of this invention, an airbag support assembly includes an outer rim that surrounds a door flap spaced inwardly from the outer rim. A hinge member connects an outer edge of the door flap to a side of the outer rim. A plurality of support walls for supporting an airbag module are secured to the outer rim of the airbag support assembly. A plurality of fasteners are provided for securing the airbag module to the support walls. A space between the door flap and the outer rim is designed to overlie a tear seam located on an under face of an instrument panel. The airbag support assembly provides a standardized assembly that supports an airbag module independently from the instrument panel and that permits incorporation of an airbag module into a variety of "seamless" instrument panel designs.

In one embodiment of the invention, an airbag support assembly as described above is secured to an instrument panel. The outer rim and door flap are connected to an under face of the instrument panel, preferably by ultrasonic or vibration welding techniques. These welding techniques provide a very reliable connection insuring that the outer rim and door flap will not separate from the instrument panel during deployment of an airbag. The support walls extend rearwardly from the outer rim and in combination with the plurality of fasteners they support the airbag module, which contains the airbag. The welding of the outer rim and the door flap to the instrument panel provides a design that does not require additional supporting members for supporting the instrument panel adjacent to the airbag module.

These and other features and advantages of this invention will become more apparent to those skilled in the art from the following detailed description of the presently preferred embodiment. The drawings that accompany the detailed description can be described as follows.

DETAILED DESCRIPTION OF THE PREFERRED EMBODIMENT

Figure 1:
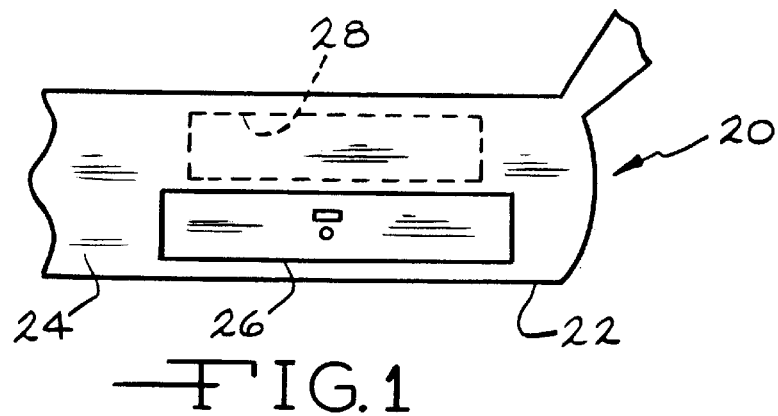
FIG. 1 is a front view of an instrument panel having an airbag support assembly designed according to the present invention.

A vehicle instrument panel is shown generally at 20 in FIG. 1. The vehicle instrument panel 20 includes an instrument panel body 22 having a front, or show face 24 and a glove box 26. Shown in phantom outline is an airbag support assembly 28 located behind the front face 24.

Figure 2:
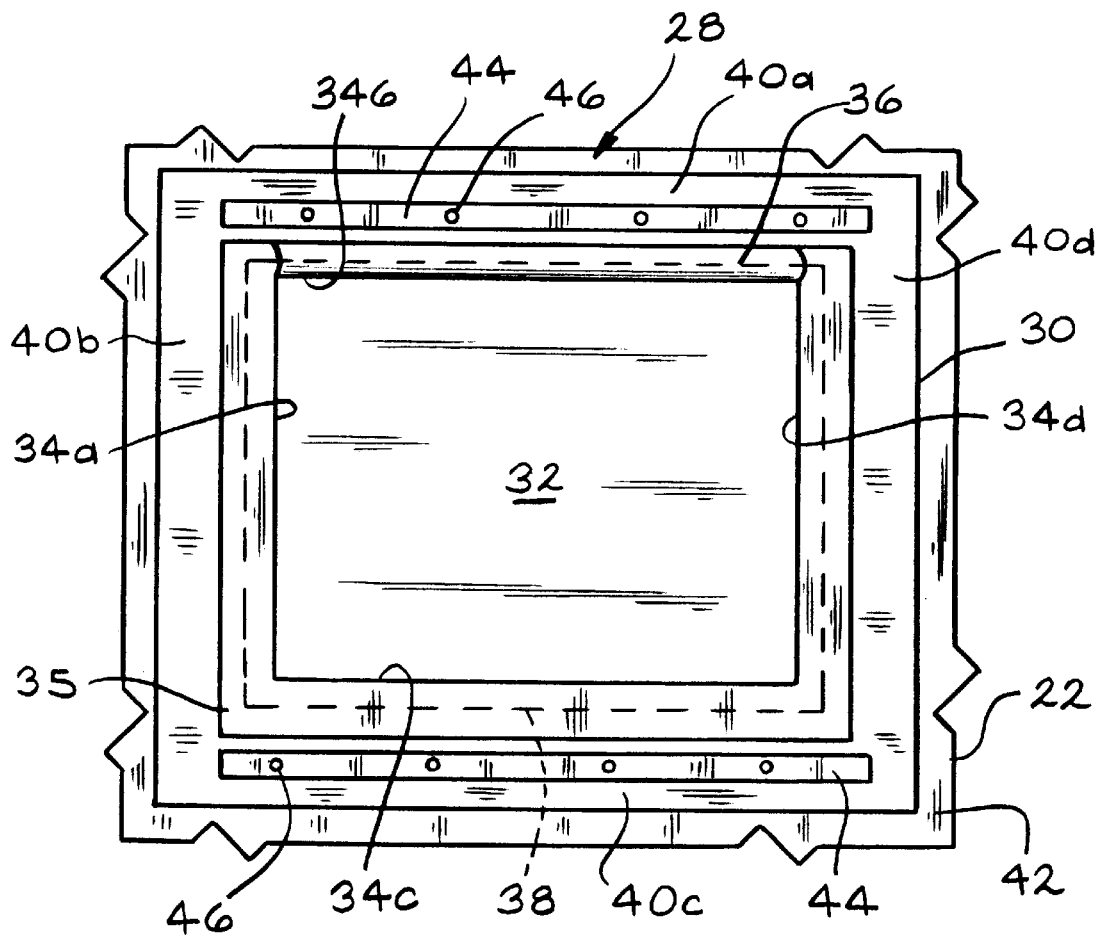
FIG. 2 is a rear view of an embodiment of the airbag support assembly of the present invention secured to an instrument panel body.

FIG. 2 is a rear view of one embodiment of the airbag support assembly 28 secured to an under face 42 of the instrument panel body 22. The under face 42 is opposite the front face 24. The airbag support assembly 28 has an outer rim 30 and door flap 32. The door flap 32 has a plurality of outer edges 34*a–d* and the outer rim 30 has a plurality of sides 40*a–d*. A flexible hinge member 36 connects one of the outer edges 34*b* to one of the sides 40*a* of the outer rim 30. The outer edges 34*a–d* are spaced inwardly from the outer rim 30, which creates a gap 35 between the outer rim 30 and all of the outer edges 34*a–d*. The gap 35 overlies a tear seam 38 that is shown in phantom outline in relation to the outer rim 30 and the door flap 32. The tear seam 38 is located on the under face 42 of the instrument panel body 22. The airbag support assembly 28 described thus far is similar to that disclosed in co-pending U.S. application Ser. No. 09/071181, filed on May 1, 1998. A pair of support walls 44 are secured to and extend from outer rim 30. Each support wall 44 includes a plurality of fasteners 46 for securing an airbag module 48 (see FIG. 3) to each support wall 44. Alternative embodiments of fastener 46 are described in FIGS. 4 through 6.

Preferably, the airbag support assembly 28 is formed of a thermoplastic urethane. Forming the airbag support assembly 28 from a thermoplastic enables the outer rim 30 and the door flap 32 to conform to the shape of the under face 48 so the same standardized design can be used in instrument panels having a variety of configurations. Preferably, support walls 44 are integral with and formed from the outer rim 30, but, as will be understood by one of ordinary skill in the art, support walls 44 could be separate from outer rim 30 and secured to outer rim 30 by a welding technique as described below.

The hinge member 36 is shown as contiguous along substantially the entire length of an outer edge 34*b*. As will be understood by one of ordinary skill in the art, the hinge member 36 could be formed of multiple spaced apart hinges along the outer edge 34*b* or it could be formed of a single hinge that did not extend along the entire length of the outer edge 34*b*. Although the hinge member 36 is shown as integral with outer rim 30 and door flap 32, as will be understood by one of ordinary skill in the art, hinge member 36 could be a seperate member that was secured to door flap 32 and outer rim 30 either mechanically or by a chemical bond.

Figure 3:
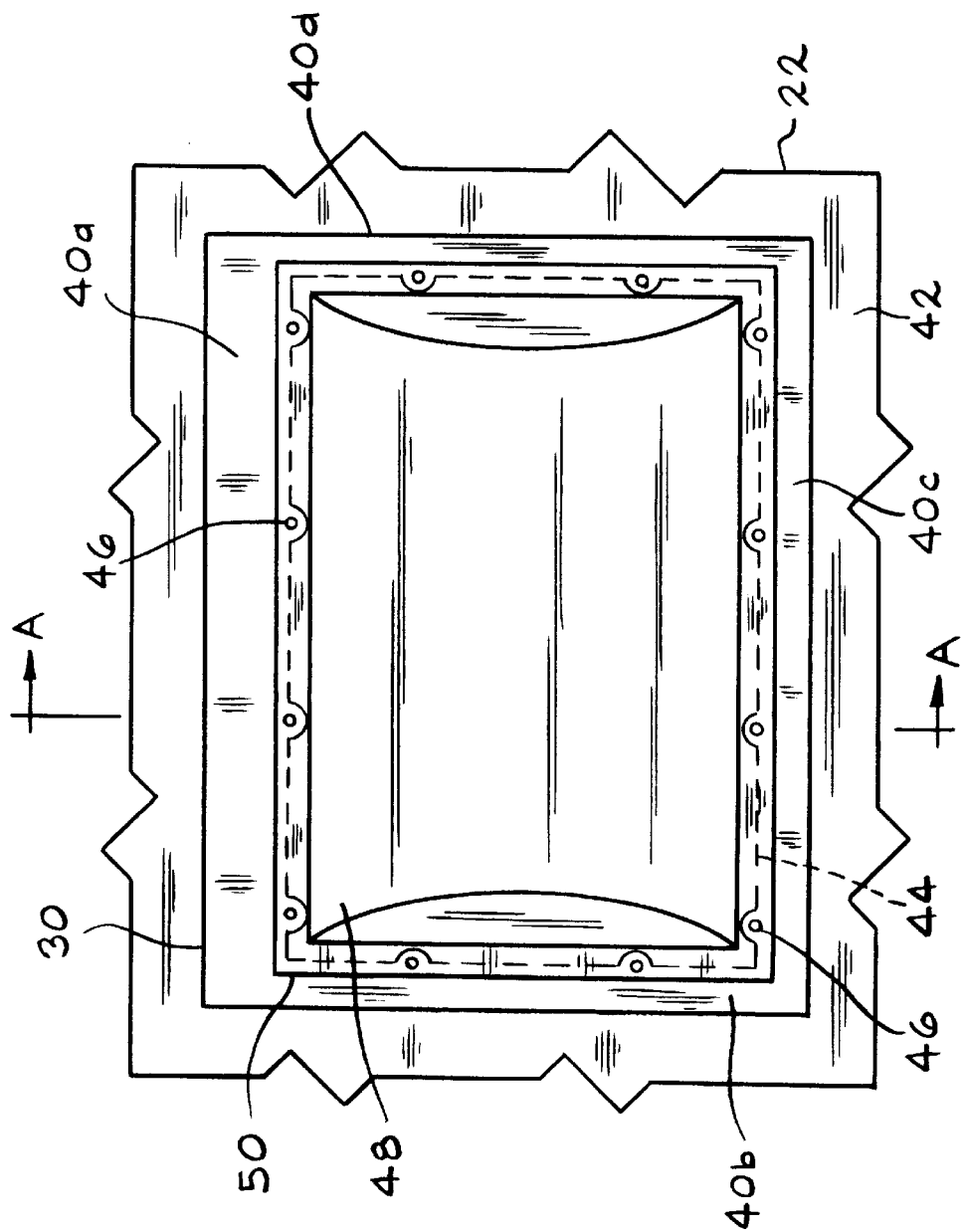
FIG. 3 is a rear view of an embodiment of an airbag support assembly of the present invention secured to an instrument panel body.

FIG. 3 is a rear view of an alternative embodiment of the airbag support assembly 28 secured to the under face 42 of the instrument panel body 22. In this embodiment the only change from the embodiment shown in FIG. 2 is that the airbag support assembly 28 includes four support walls 44, shown in phantom outline. This embodiment includes the outer rim 30 having a plurality of sides 40*a,–d* the door flap 32 having a plurality of outer edges 34*a–d*, and the flexible hinge member 36 connecting one of the outer edges 34*b* to one of the sides 40*a* of the outer rim 30 (see FIG. 2). The gap 35 between the outer rim 30 and all of the outer edges 34*a–d* overlies the tear seam 38 located on the under face 42 of the instrument panel body 22 (see FIG. 2). An airbag module 48 having a flange 50 is secured to support walls 44 by fasteners 46. Each of fasteners 46 extend through an aperture (not shown) in flange 50 and into one of support walls 44. In this embodiment, support walls 44 are widened in the area where a fastener 46 enters support wall 44.

Figure 4:
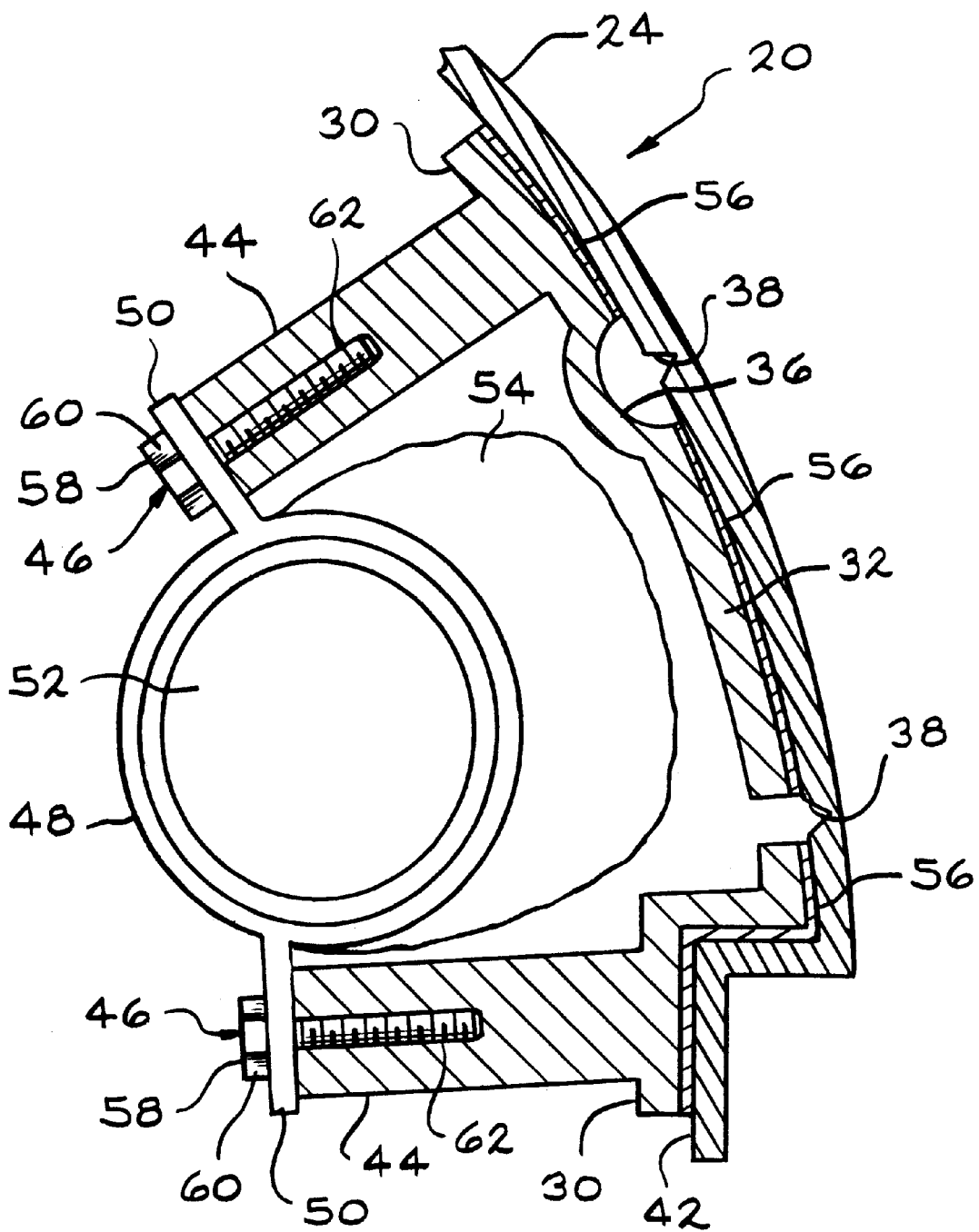
FIG. 4 is a cross-sectional view along line A—A of FIG. 3 showing one embodiment of a fastener of the present invention.

FIG. 4 is a cross-sectional view along line A—A of FIG. 3 showing one embodiment of a fastener 46 of the present invention. Airbag module 48 includes an airbag inflator 52 and an airbag 54 and is located behind the door flap 32. The airbag module 48, airbag inflator 52, and airbag 54 are shown schematically for illustration purposes since they are known in the art and their construction forms no part of the invention. As will be understood by one of ordinary skill in the art, the shape of the airbag module 48, airbag inflator 52 and airbag 54 may vary from that shown, as is known in the art.

A welded joint 56 secures the outer rim 30 and the door flap 32 to the under face 48. It is most preferable that the outer rim 30 and the door flap 32 be vibration welded to the under face 48 of the instrument panel body 22 to form the welded joint 56. The vibration weld provides a very strong connection between the airbag support assembly 28 and the instrument panel body 22. This strong support enables the support walls 44 to be provided by the airbag support assembly 28 rather than the instrument panel body 22. As will be understood by one of ordinary skill in the art, outer rim 30 and door flap 32 could also be secured to under face 48 by an adhesive.

In this embodiment, fastener 46 comprises a screw 58 having a head 60 and a threaded shaft 62. Screw 58 extends through an aperture (not shown) in flange 50 and into support wall 44 to secure airbag module 48 to support wall 44.

Although the hinge member 36 is shown as having a U-shape in cross-section, other shapes may be used, for example, the hinge member 36 could have a V-shaped cross-section.

Figure 5:
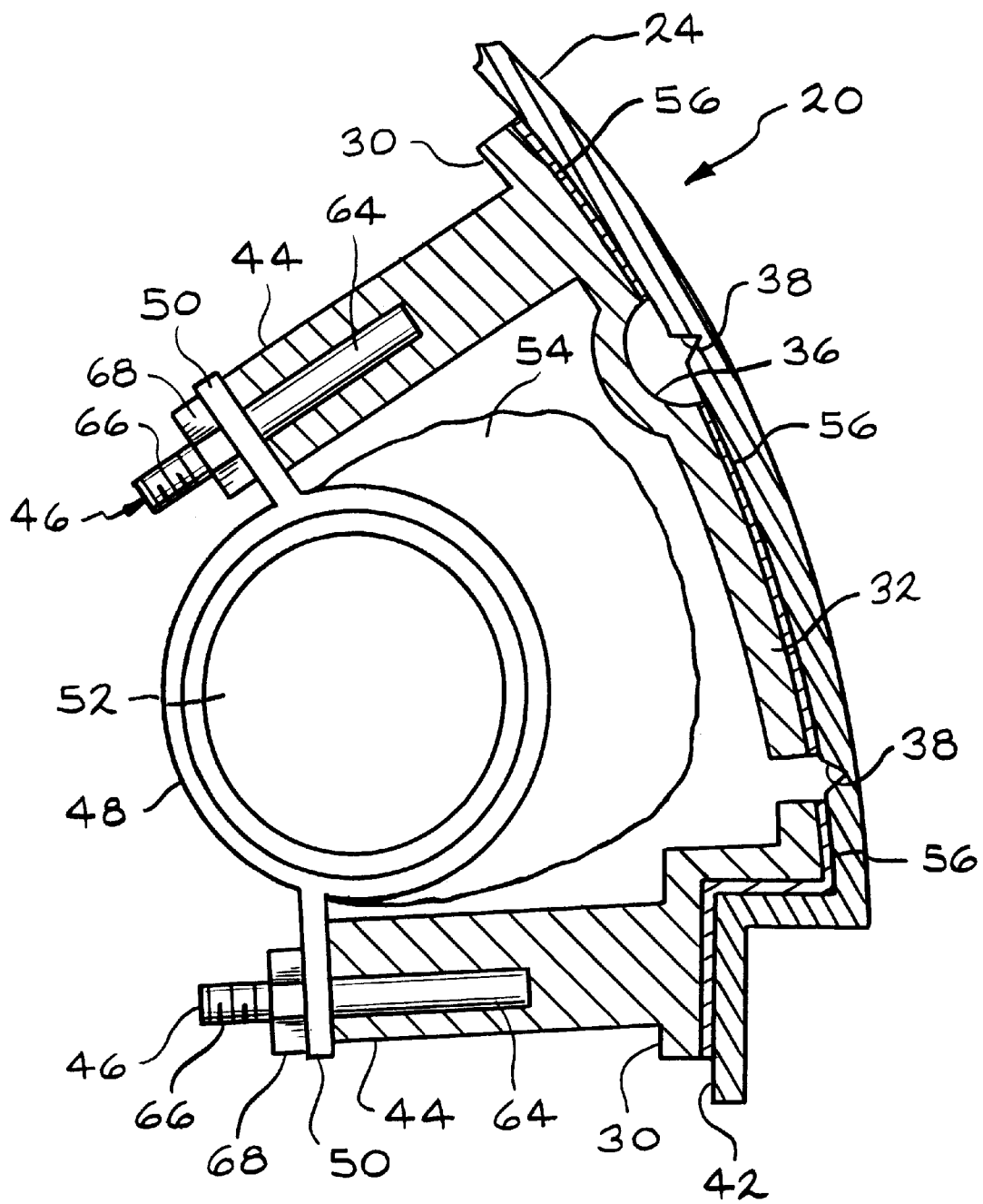
FIG. 5 is a cross-sectional view along line A—A of FIG. 3 showing another embodiment of a fastener of the present invention.

FIG. 5 is a cross-sectional view along line A—A of FIG. 3 showing an alternative embodiment of a fastener 46 of the p resent invention. In this embodiment, fastener 46 comprises a pin 64 that is embedded in support wall 44. Pin 64 includes a threaded portion 66 that extends through an aperture (not shown) in flange 50 of airbag module 48. A nut 68 engages threaded portion 66 and secures airbag module 48 to support walls 44.

Figure 6:
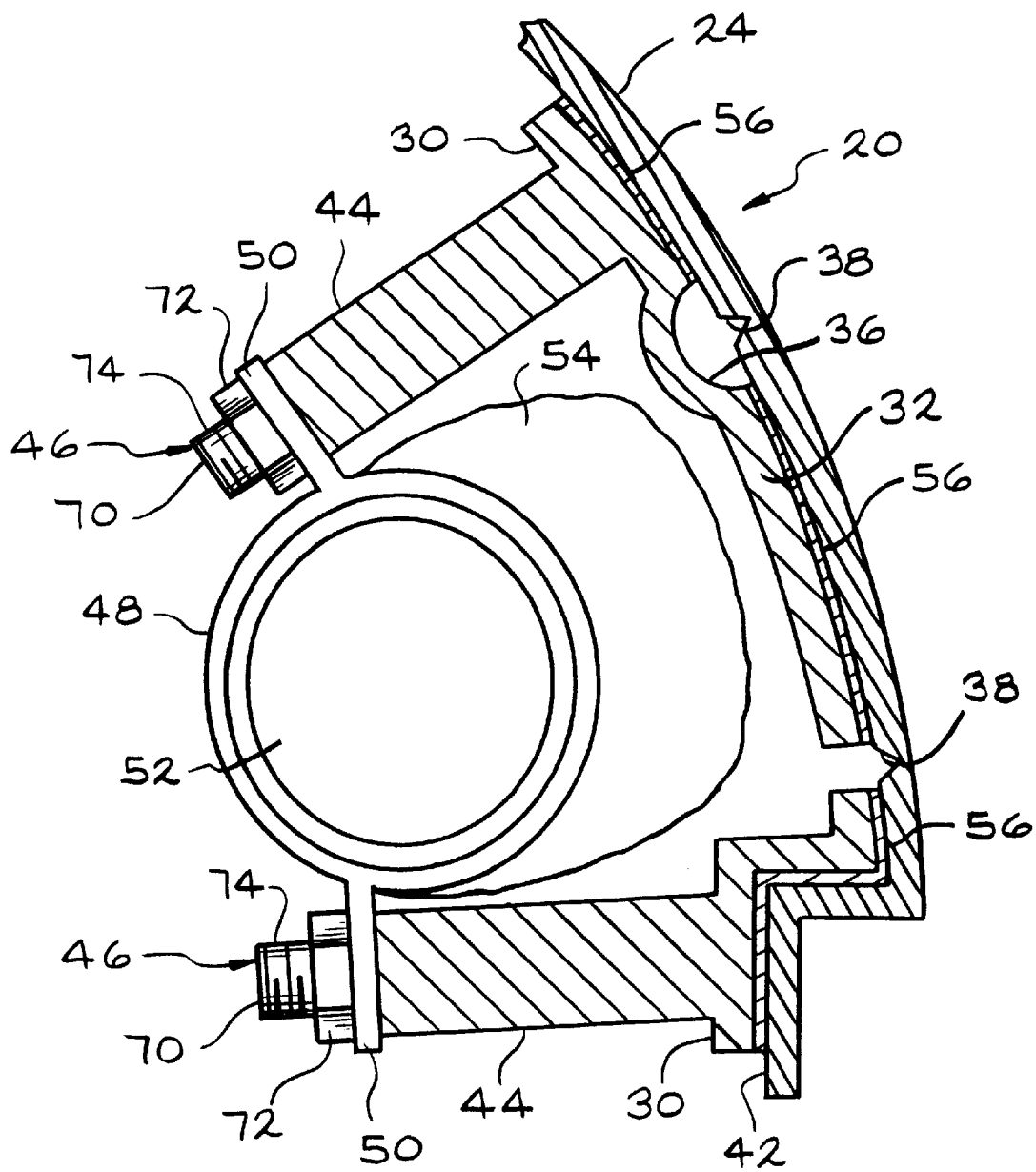
FIG. 6 is a cross-sectional view along line A—A of FIG. 3 showing another embodiment of a fastener of the present invention.

FIG. 6 is a cross-sectional view along line A—A of FIG. 3 showing an alternative embodiment of fastener 46 of the present invention. In this embodiment, fastener 46 comprises a pin 70 that is integral with and formed from support wall 44. Pin 70 extends through an aperture (not shown) in flange 50 of airbag module 48. A self-threading nut 72 engages pin 70 and cuts threads 74 in pin 70. Self-threading nut 72 secures airbag module 48 to support walls 44.

Figure 7:
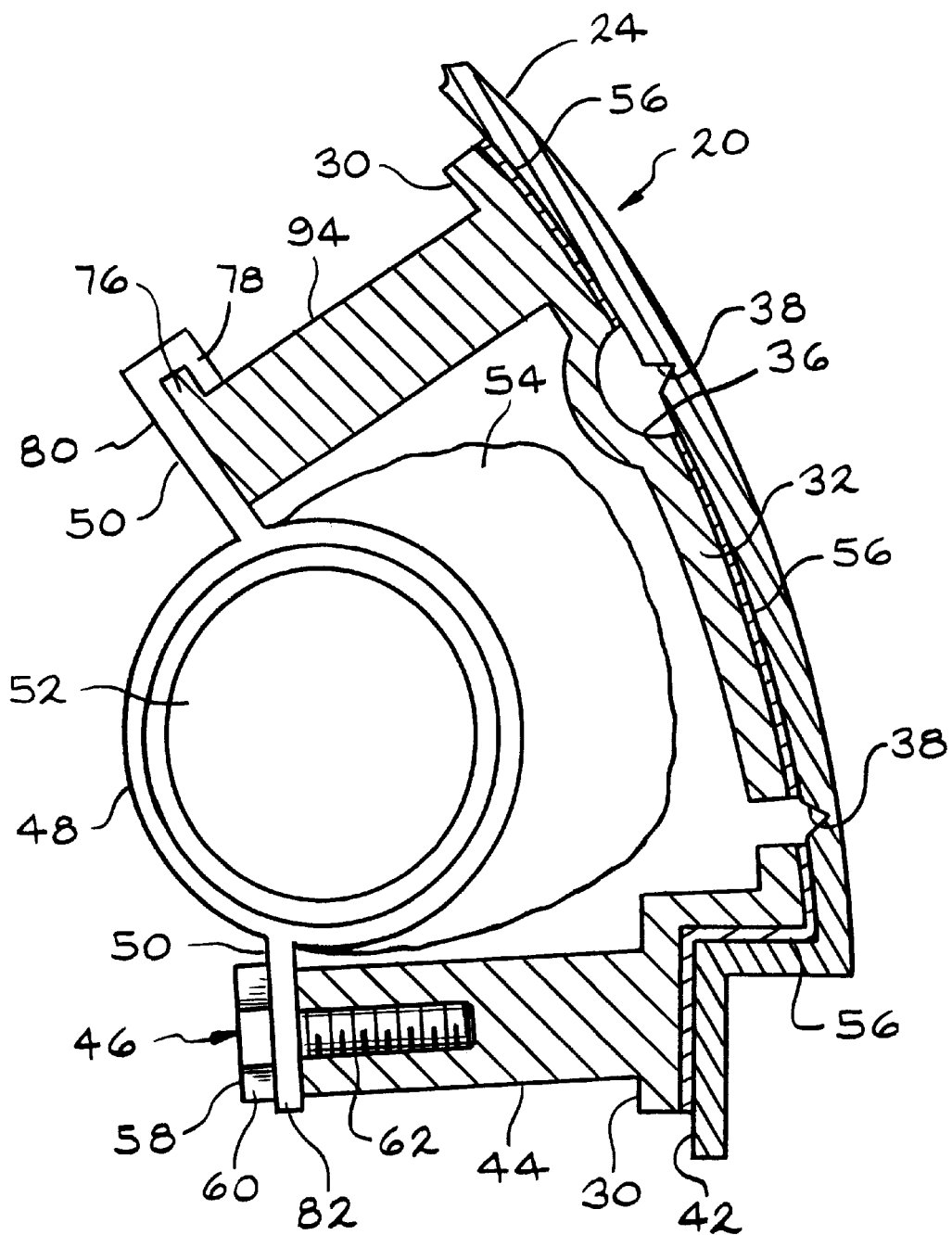
FIG. 7 is a cross-sectional view of another embodiment of the airbag support assembly and an airbag module of the present invention.

FIG. 7 is a cross-sectional view of an alternative embodiment of the airbag support assembly 28 of the present invention. In this embodiment, one of support walls 44 includes a lip 76. A channel 78 is formed on a first portion 80 of flange 50. Channel 78 forms an interlocking engagement with lip 76. Channel 78 can either be snapped over lip 76 or slid over lip 76 to form the interlocking engagement. A second portion 82 of flange 50 is secured to another of the support walls 44 by fastener 46. In this embodiment, the fastener 46 could comprise any of the embodiments shown in FIGS. 4 through 6. For illustration purposes only, the fastener 46 shown in FIG. 7 comprises screw 58. As should be understood, there would be a plurality of the fasteners 46 spaced into the plane of FIG. 7. Preferably, lip 76 extends continuously along the entire length of its support wall 44 and channel 78 extends continuously along the entire length of first portion 80 of flange 50. As will be understood by one of ordinary skill in the art, lip 76 could be formed of multiple spaced apart lips along support wall 44 or it could be formed of a single lip that did not extend along the entire length of the support wall 44. Likewise, as will be understood by one of ordinary skill in the art, channel 78 could be formed of multiple spaced apart channels along first portion 80 of flange 50 or it could be formed of a single channel that did not extend along the entire length of first portion 80 of flange 50.

In all of the embodiments shown in FIGS. 1 through 7, when the airbag 54 deploys it will initially be forced against the underside of the door flap 32 and the hinge member 36. The airbag 54 then ruptures the instrument panel body 22 along the tear seam 38 so that the portion of the instrument panel body 22 within the outlines of the tear seam 38 separates from the rest of the instrument panel body 22 and moves with the door flap 32. The hinge member 36 permits the door flap 32 to rotate outwardly so that the airbag 54 can be released into the passenger compartment. During and after deployment of the airbag 54 the weld joint 56 maintains the contact between the under face 48 and the outer rim 30 and between the under face 48 and the door flap 32. In the present design the outer rim 30 surrounds the door flap 32 and the tear seam 38 thus the outer rim 30 supports the entire area of the instrument panel body 22 around the tear seam 38 and the door flap 32. This sup port of the instrument panel body 22 permits the instrument panel 20 to be designed with fewer support members.

The present invention has been described in accordance with the relevant legal standards, thus the foregoing description is exemplary rather than limiting in nature. Variations and modifications to the disclosed embodiment may become apparent to those skilled in the art and do come within the scope of this invention. Accordingly, the scope of legal protection afforded this invention can only be determined by studying the following claims.

We claim:

1. An instrument panel comprising:

an instrument panel body having a front face and an under face, said under face having a tear seam to facilitate deployment of an airbag;

an airbag support assembly comprising an outer rim, a hinge member, a plurality of support walls and a door flap having a plurality of outer edges;

said outer edges spaced apart from, and inwardly of said outer rim to form a gap;

said hinge member connecting one of said plurality of outer edges to said outer rim;

said support walls secured to said outer rim and a plurality of fasteners securing an airbag module to said support walls; and said outer rim and said door flap secured to said under face of said instrument panel.

2. An instrument panel as recited in claim 1, wherein said gap overlies said tear seam.

3. An instrument panel as recited in claim 1, wherein said plurality of fasteners comprises a plurality of screws, each of said screws extending through an aperture in a flange of said airbag module and into one of said plurality of support walls, said screws securing said airbag module to said support walls.

4. An instrument panel as recited in claim 1, wherein said plurality of fasteners comprises a plurality of pins extending from said support walls, each of said pins extending through an aperture in a flange of said airbag module, each of said pins receiving a securing member, said securing members securing said airbag module to said support walls.

5. An instrument panel as recited in claim 4 wherein said securing member comprises a nut and each of said pins is embedded in one of said support walls, each of said pins further including a threaded portion, said threaded portion receiving said nut, said nut securing said airbag module to said support walls.

6. An instrument panel as recited in claim 4 wherein each of said pins is integral with and formed from one of said support walls and said securing member comprises a self-threading nut, each of said pins receiving said self-threading nut, said self-threading nut securing said airbag module to said support walls.

7. An instrument panel as recited in claim 1 wherein one of said support walls includes a lip and said airbag module includes a flange, said lip in interlocking engagement with a channel formed on a first portion of said flange, and a second portion of said flange secured to another of said support walls by said plurality of fasteners.

8. An airbag support assembly comprising:

an outer rim, a hinge member, a plurality of support walls and a door flap having a plurality of outer edges;

said outer edges spaced apart from, and inwardly of said outer rim to form a gap;

said hinge member connecting one of said plurality of outer edges to said outer rim; and said support walls secured to said outer rim and a plurality of fasteners for securing an airbag module to said support walls.

9. An airbag support assembly as recited in claim 8 wherein said airbag support assembly comprises a thermoplastic urethane.

10. An airbag support assembly as recited in claim 8, wherein said plurality of fasteners comprises a plurality of screws, each of said screws for extending through an aperture in a flange of an airbag module and into one of said plurality of support walls, said screws for securing said airbag module to said support walls.

11. An airbag support assembly as recited in claim 8, wherein said plurality of fasteners comprises a plurality of pins extending from said support walls, each of said pins for extending through an aperture in a flange of an airbag module, each of said pins receiving a securing member, said securing members for securing said airbag module to said support walls.

12. An airbag support assembly as recited in claim 11 wherein said securing member comprises a nut and each of said pins is embedded in one of said support walls, each of said pins further including a threaded portion, said threaded portion receiving said nut, said nut for securing said airbag module to said support walls.

13. An airbag support assembly as recited in claim 11 wherein each of said pins is integral with and formed from one of said support walls and said securing member comprises a self-threading nut, each of said pins receiving said self-threading nut, said self-threading nut for securing said airbag module to said support walls.

14. An airbag support assembly as recited in claim 8 wherein one of said support walls includes a lip, said lip for forming an interlocking engagement with a channel formed on a first portion of a flange of an airbag, and said plurality of fasteners for securing a second portion of said flange to another of said support walls.

15. An airbag support assembly as recited in claim 8 further including an airbag module having an airbag inflator and an airbag, said plurality of fasteners securing said airbag module to said support walls.

* * * * *